United States Patent [19]
Kwon

[11] Patent Number: 5,627,347
[45] Date of Patent: May 6, 1997

[54] DIGITIZER HAVING IMPROVED SIGNAL TO NOISE CHARACTERISTICS

[75] Inventor: Ki-Duck Kwon, Seoul, Rep. of Korea

[73] Assignee: Samsung Display Devices Co., Ltd., Kyungki-Do, Rep. of Korea

[21] Appl. No.: 227,630

[22] Filed: Apr. 14, 1994

[30] Foreign Application Priority Data

Apr. 20, 1993 [KR] Rep. of Korea .................. 93-6286

[51] Int. Cl.⁶ .................. G08C 21/00; G09G 3/02
[52] U.S. Cl. .................. 178/18; 178/19; 345/173
[58] Field of Search .................. 178/18, 19, 20; 345/173, 179

[56] References Cited

U.S. PATENT DOCUMENTS

| | | | |
|---|---|---|---|
| 4,479,032 | 10/1984 | Parnell | 178/19 |
| 4,665,283 | 5/1987 | Kable | 178/19 |
| 4,705,919 | 11/1987 | Dhawan | 178/19 |
| 4,798,919 | 1/1989 | Miessler | 178/18 |
| 4,831,566 | 5/1989 | Mathews | 178/20 |
| 4,873,398 | 10/1989 | Hubby, Jr. | 178/18 |
| 5,054,005 | 10/1991 | Schorum | 178/18 |
| 5,072,076 | 12/1991 | Camp, Jr. | 178/20 |
| 5,140,107 | 8/1992 | Crooks | 178/19 |
| 5,159,159 | 10/1992 | Asher | 178/18 |
| 5,220,136 | 6/1993 | Kent | 178/18 |
| 5,231,381 | 7/1993 | Duwaer | 178/19 |

Primary Examiner—Wellington Chin
Assistant Examiner—Vijay Shankar
Attorney, Agent, or Firm—Leydig, Voit & Mayer

[57] ABSTRACT

A digitizer includes a flat panel medium with which a stylus contacts for information input, an outputting device for visualizing and outputting information according to the information input by the stylus, and a resistor installed between the outputting device and the flat panel medium in a predetermined pattern, wherein a flat panel glass substrate having a predetermined thickness is laminated on the outputting. The resistor has a predetermined conductivity and is laminated on the glass substrate in a predetermined pattern, and a thin film dielectric layer is laminated on the patternized resistor.

4 Claims, 1 Drawing Sheet

DIGITIZER HAVING IMPROVED SIGNAL TO NOISE CHARACTERISTICS

BACKGROUND OF THE INVENTION

The present invention relates to a digitizer, and more particularly, to a digitizer having a dielectric layer formed by screen-printing or vacumm-depositing a transparent dielectric material onto a transparent resistor pattern.

Along with a remarkable development of the electronics industry, a variety of attempts have been made to generate a series of signals from electrographic devices. As a matter of course, the industrial demands for such electrographic devices have also been increased with the advancement of such industrial fields as computer graphics, computer aided design (CAD) and computer aided manufacturing (CAM).

A digitizer is one such electrographic element. In general, a digitizer adopts the same manual operative method as that applied in conventional graphic design. Typically, the digitizer has been manufactured with a complicated checkered net grid type electrode structure. While such a net grid type digitizer supplies a precise linear output signal, the manufacturing cost thereof is increased due to its complicated structure and it is liable to be damaged in use. Moreover, from various applications, it has proved to be desirable to manufacture such a digitizer from extremely transparent synthetic material. However, conventional digitizers generally exclude such a factor as transparency. In the meanwhile, in consideration of the above problems, a new digitizer has been developed the configurational characteristics of which are disclosed in detail in U.S. Pat. Nos. 4,650,926 and 4,853,493. In view of the structure, there is a characteristic difference in that the digitizer disclosed in the former patent (U.S. Pat. No. 4,650,926) is structured such that a dielectric layer is deposited on a layer made of material having a predetermined resistance value, and the digitizer disclosed in the latter one (U.S. Pat. No. 4,853,493) is structured such that a resistance layer is deposited on an insulation layer.

FIG. 1 is a schematic diagram of the conventionally applied digitizer based on the structure of the digitizers described above. Referring to FIG. 1, in the conventional digitizer, a display 14 is disposed in the lowermost portion, a laminated layer 13 (or indium tin oxide (ITO) layer) is deposited thereon, and a patternized transparent resistor 12, e.g., ITO is deposited thereon. Also, a glass substrate 11 is disposed on the uppermost portion of the patternized transparent resistor 12. Here, reference numeral 15 denotes a stylus which selects a desired character or a symbol by being moved in contact with the glass substrate 11. Either a flat panel liquid crystal display (LCD) or a plasma display panel (PDP) are generally used as the display 14.

Meanwhile, in such a structure, the electrostatic capacitance between the stylus 15 and the patternized transparent resistor 12 can be expressed in the relationship such that $C = \xi \times A/d$. The descriptive diagram for explaining the above relationship is shown in FIG. 3. Here, a reference letter C denotes electrostatic capacitance, $\xi$ denotes a dielectric constant of glass, A denotes the area of the patternized transparent resistor, and d denotes the thickness of the glass substrate. In the conventional digitizer, the glass substrate 11 is generally made of thick glass to some extent. Therefore, since the electrostatic capacitance between the stylus 15 on the surface of the glass substrate 11 and the patternized transparent resistor 12 is relatively low, the signal-to-noise (S/N) ratio is deteriorated. As a result, it becomes difficult to select the circuit elements for constituting the digitizer and the operational characteristics of the digitizer are also lowered, thereby eventually resulting in reducing the preciseness of the output signal of the display in relation to the input signal of the stylus.

SUMMARY OF THE INVENTION

To solve the above problem, an object of the present invention is to provide a digitizer having means which can increase the electrostatic capacitance between a stylus and a patternized transparent resistor, and minimize noise from the display.

To accomplish the above object, a digitizer according to the present invention comprises:

a flat panel medium with which a stylus contacts for information input;

outputting means for visualizing and outputting information according to the information input by means of the stylus; and a resistor installed between the outputting means and the flat panel medium in a predetermined pattern;

wherein a flat panel glass substrate having a predetermined thickness is laminated on the outputting means, a resistor having a predetermined conductivity is laminated on the glass substrate in a predetermined pattern, and a thin film dielectric layer is laminated on the patternized resistor.

As described above, since the digitizer according to the present invention includes the thin film dielectric layer formed on the patternized transparent resistor, the electrostatic capacitance value depending on the voltage applied to the stylus is exceedingly high, compared to the conventional digitizer, thereby enabling the signals-to-noise ratio to be greatly increased, which will contribute to the enhancement of the products to which the digitizer according to the present invention will be adopted hereafter, due to the betterment of their operational characteristics.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 1:
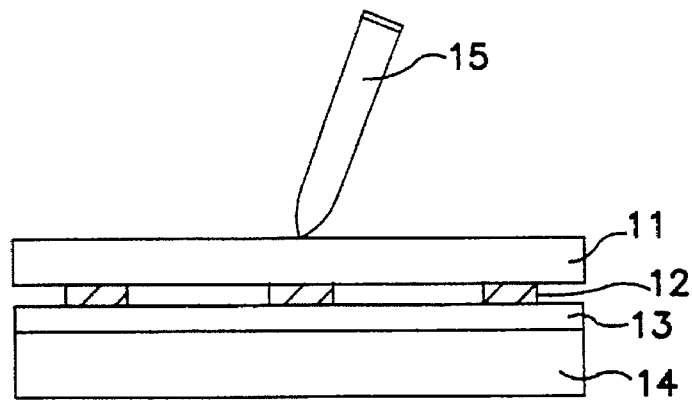
FIG. 1 is a vertical cross-sectional view showing schematically the structure of a conventional digitizer.
Figure 2:
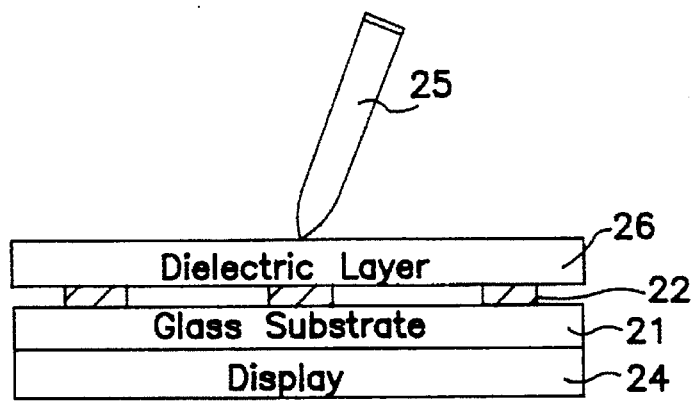
FIG. 2 is a vertical cross-sectional view showing schematically the structure of the digitizer according to the present invention.
Figure 3:
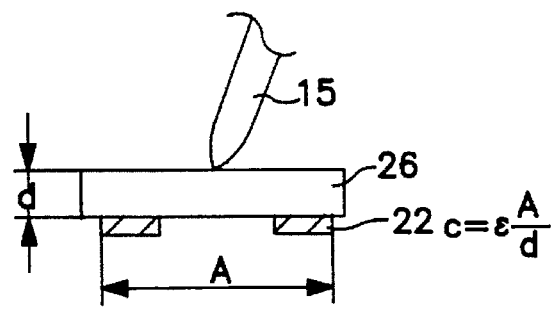
FIG. 3 is a drawing for explaining the equation representing electrostatic capacitance.

Referring to FIG. 2, a flat panel display 24 having a predetermined thickness and size is placed in the lowermost position and a flat panel glass substrate 21 also having a predetermined thickness and size is laminated thereon. A flat panel display device, i.e., a liquid crystal device (LCD) or a plasma display panel (PDP) is typically adopted as the display 24. Also, a transparent resistor 22 having a predeterminded conductivity is laminated on the glass substrate 21 in a predetermined pattern. Indium tin oxide (ITO) can be used for the transparent resistor. After a dielectric paste having a predetermined dielectric factor is repeatedly screen-printed on the patternized transparent resistor 22 several times, or a dielectric layer made of $SiO_2$, etc. is vacuum-deposited, a thin film dielectric layer 26 having a thickness of about 1–20 µm is finally formed through a heating process at a temperature of about 500° C. to 650° C. Here, reference numeral 25 designates a stylus which receives a predetermined information as its input.

Now, the operation of the digitizer according to the present invention, constituted as described above will be briefly described.

The stylus 25 is made to be placed in contact with the surface of the dielectric layer 26 in the state that a predetermined AC power supply is applied to the stylus 25. Thereafter, if the stylus 25 is moved to be placed at a desired position of the surface of the dielectric layer 26, a predetermined magnitude of electrostatic capacitance is generated between the tip of the stylus 25 and the lower surface of the dielectric layer 26. A voltage according to the electrostatic capacitance is applied to the patternized transparent resistor 22. At this time, the current flowing in the transparent resistor 22 is detected by the driving circuit (not shown) in the display 24. The thus detected current is again converted into a voltage depending on the corresponding resistance and then converted into direct current via a rectifier (not shown). Thereafter, the direct current is again converted into a digital signal via an analog-to-digital (A/D) converter (not shown), and thereby a coordinate is identified and the signals are displayed on the display panel of the display 24. In such an operation, the uppermost dielectric layer 26 to which the electrostatic capacitance is applied by the voltage applied to the stylus 25 has a great meaning. In other words, as understood from the aforementioned electrostatic capacitance relationship ($C=\xi \times A/d$), since the capacitance C is in inverse proportion to the thickness D of the dielectric material, the thinner the thickness thereof is, the more capacitance is applied. As the capacitance becomes more, the voltage from which a better output signal is obtained is transmitted while the voltage attenuation is kept at a minimum. Thus, the magnitude of the output signal becomes larger. In order to satisfy such a relation, a thin film dielectric layer 26 having a thickness of about 1–20 µm is placed on the uppermost portion.

Meanwhile, for the purpose of driving the display 24, the voltage applied thereto also functions as a noise source, against which the present invention adopts a glass substrate 21 installed between the display 24 and the transparent resistor 22 so that noise is minimized.

As described above, since the digitizer according to the present invention includes a thin film dielectric layer formed on a patternized transparent resistor, the electrostatic capacitance value depending on the voltage applied to the stylus becomes exceedingly high, compared to the conventional digitizer, thereby enabling the signal-to-noise ratio to be greatly increased, which will contribute to the enhancement of the products to which the digitizer according to the present invention will be adopted hereafter, due to the betterment of their operational characteristics.

What is claimed is:

1. A digitizer comprising:

a non-conductive flat panel glass substrate having a predetermined thickness;

a resistor disposed on said non-conductive flat panel glass substrate, said resistor being laminated on said non-conductive flat panel glass substrate in a predetermined pattern and having a predetermined conductivity;

a thin film dielectric layer laminated on said resistor; said thin film dielectric layer including an electrostatic capacitance and a signal-to-noise ratio functionally related to the electrostatic capacitance; and outputting means for visualizing and outputting information, said non-conductive flat panel glass substrate being laminated on said outputting means.

2. The digitizer as claimed in claim 1, wherein said thin film dielectric layer is formed in a thickness of about 1–20 µm.

3. A digitizer comprising:

a display;

a non-conductive flat panel glass substrate having a predetermined thickness, said non-conductive flat panel glass substrate being laminated on said display;

a resistor laminated on said non-conductive flat panel glass substrate in a predetermined pattern and having a predetermined conductivity; and a thin film dielectric layer laminated on said resistor; said thin film dielectric layer exhibiting an electrostatic capacitance when contacted with an input device to increase a signal-to-noise ratio of said thin film dielectric layer.

4. The digitizer as claimed in claim 3, wherein said thin film dielectric layer is formed to a thickness of about 1–20 µm.

* * * * *